ROBERT C. VALENTINE
WILLIAM S. TOZER, JR.
*INVENTORS*

ROBERT C. VALENTINE
WILLIAM S. TOZER, JR.
*INVENTORS*

United States Patent Office

3,360,928
Patented Jan. 2, 1968

3,360,928
TURBINE STARTER HAVING PNEUMATICALLY ACTUATED ENGAGEMENT MECHANISM
Robert C. Valentine, Utica, and William S. Tozer, Jr., Schuyler, N.Y., assignors to The Bendix Corporation, a corporation of Delaware
Filed May 19, 1966, Ser. No. 551,375
4 Claims. (Cl. 60—39.14)

ABSTRACT OF THE DISCLOSURE

A device to provide a selective pneumatic assist to the advance mechanism of turbine starters. This invention employs a slidable clutch member which advances into a driven clutch member attached to an engine to be started under the influence of pneumatic pressure obtained from the turbine exhaust with the pneumatic pressure being employed as the sole means of advance, or in combination with other means and the turbine itself is the valving control means.

---

Turbine driven starters include as basic elements a compressible fluid driven turbine wheel and engagement means which transmit torque from turbine to engine during starting mode and either disengage or permit the engine to overrun the starting device after start-up and thus effectively prevent reverse torque transmission from engine to starter.

The motive compressible fluid for driving the turbine may be either a pneumatic pressurized air source from a separate storage compartment or independent generating equipment or may be self-generated by the starter itself such as when it takes the form of a small gas turbine engine.

Engagement means are preferably separable jaws or gears capable of full disengagement and thereby offer the advantage of eliminating any frictional connection between engine and starter such as overruning clutches which are subject to wear and produce a running drag on the engine.

The present invention provides pneumatic means for engaging or assisting with the engagement motion of normally separated torque transmitting jaws or gears. In the preferred form, pneumatic means are utilized as an assist to an inertia advance mechanism providing earlier and more positive advancement characteristic which avoids impositive initial engagement followed by high shock loads.

It is an object of the present invention to provide a turbine starter with separable engine engaging jaw clutch or gear members having improved jaw advance mechanism producing positive early engagement and minimizing shock loads.

It is another object of the present invention to provide a turbine starter with pneumatically actuated jaw advance mechanism.

It is a still further object of the present invention to provide a turbine starter with pneumatic means assisting inertia engagement means.

It is a still further object of the present invention to provide a turbine starter having pneumatic means having higher effectiveness to initiate engagement and means automatically reducing pressure after start up.

Other objects and advantages of the present invention will become apparent on consideration of the accompanying specification and drawings wherein.

Figure 1:
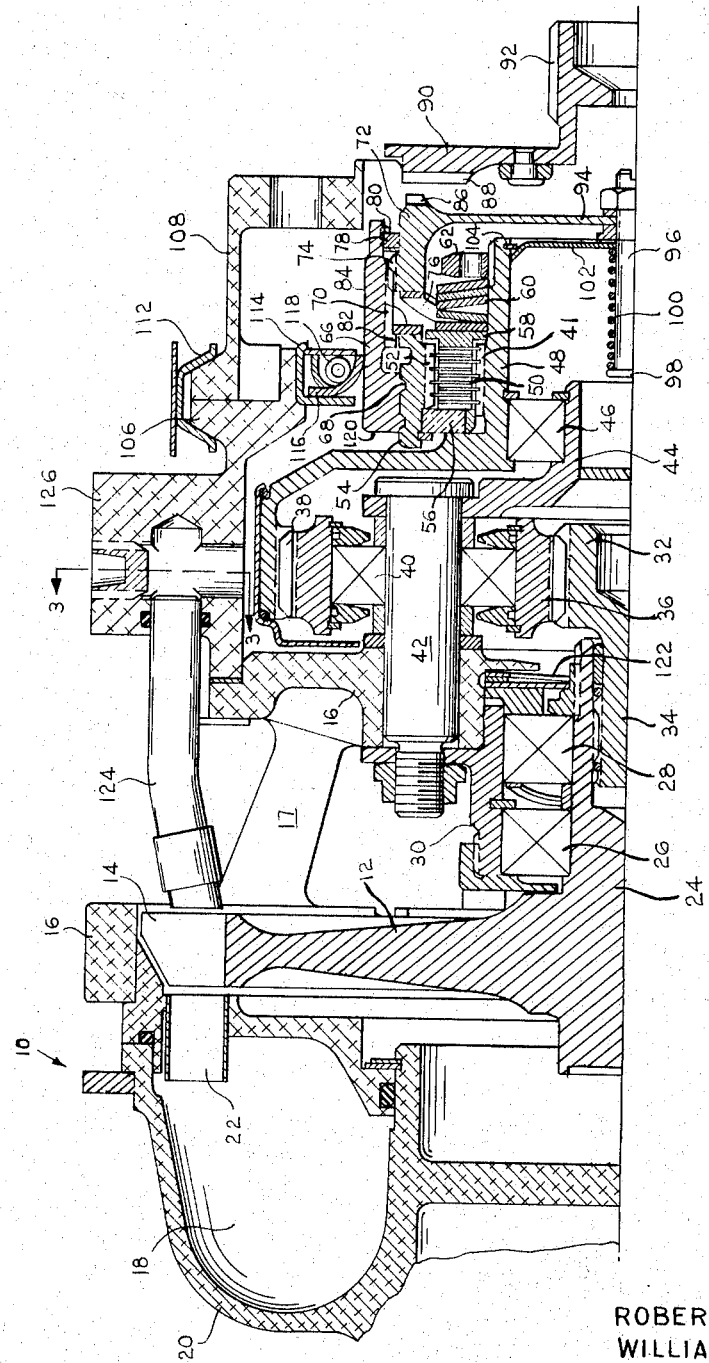
FIGURE 1 is a half cross-sectional view of a turbine starter having pneumatic engagement means in accordance with the teachings of the present invention.

Referring to the drawings, there is shown a turbine starter generally designated by numeral 10 having a turbine wheel 12 with peripheral blades 14. A housing section 16 encloses the turbine and defines a plenum chamber 18 with forward housing section 20. Casing section 16 has openings 17 formed in its side wall. Turbine inlet blades 22 are fixedly mounted in the housing and guide the entry direction of compressible fluid into blades 14.

Centrally of the turbine wheel there is a stub support shaft 24 mounted within a pair of spaced bearings 26 and 28 which are retained at their outer diameter in fixed support member 30.

Shaft 24 is connected to a planetary gear reduction unit consisting of sun gear 32 having a connecting shaft 34, planetary gear 36 and ring gear 38. The planet gears, one shown, are mounted on bearings 40 which permit rotation about planet shaft 42. The planet shaft is retained on its left end in an extension of fixed housing 16 and also holds in fixed position bearing support member 44 which supports ring gear bearing 46.

The ring gear has a shaft extension 48 having axial splines 41 formed on its outer diameter which engage alternate discs of a friction or slip torque limiting clutch 50. A plurality of interfitting discs are engaged with splines 52, formed on the sleeve 54 which form a part of the advance mechanism. Clutch 50 is retained between axially-fixed reaction plate 56 and movable pressure plate 58. A predetermined preload is applied to pressure plate 58 by spring 60 which is adjusted to provide a selected compression force by nut 62. Clutch 50 normally provides a unitary driving connection between shaft 48 and sleeve 54; however, in the event of torque overload, it will slip, thus providing maximum torque protection for the engine.

Sleeve 54 has splines formed on its outer surface, designated by numeral 64, which may be either straight axial splines or helical splines, as illustrated, in the broadest sense of the invention. However, helical splines are the preferred arrangement since we prefer to retain the inertia advance function and use our pneumatic advance in combination with inertia advance to obtain the best combined performance characteristics of both.

Advance member 66 has splines 68 formed on its inner surface which are complementary with and loosely engage splines 64. An axial spline 70 is formed on the inner surface of member 66 and drivably engages driving jaw clutch member 72 through mating splines 74. A wavy washer spring 76 is confined between members 72 and 66 to urge driving jaw member 72 normally against stop ring 78 which is retained by snap ring 80. Axial spline 70 has a shoulder 82 which retains washer 84 which, in turn, operates as a retainer for spring 76.

Jaw clutch or gear teeth 86 are formed on the face of driving member 72 and are arranged in confronting, but axially spaced, relationship with teeth 88 formed on the driven member 90 which is adapted to be connected to the engine by pinion 92 and may be considered representative of the engine in the illustration. It will be appreciated that when starting torque is not transmitted, full separation of engine and starter is thereby provided so that no frictional forces or high wear is encountered during normal engine running operation.

Driving clutch 86 has a radially-extending plate 94 extending inwardly which supports axially-extending bolt 96 having an abutment 98 at its left most end which retains one end of a return spring 100. The other end of spring 100 abuts plate 102 which is retained by snap ring 104 in the axially fixed shaft 48. Thus, spring 100 applies a return force through bolt 96 and plate 94 which normally biases driving clutch 72 and advance member 66 in the retracted or disengaged position as illustrated.

The planetary reduction gearing and advance and engaging mechanism are substantially enclosed by housing sections 106 and 108. Housing section 106 is bolted to section 16 by bolts 110, FIGURE 2, and sections 106 and 108 are held by clamp 112. Radially inwardly of clamp 112 and mounted in the inner surface of housing section 106 is an annular retarder assembly 114 which includes an annular flexible member 116 which is held in frictional engagement with advance member 66 by annular ring or garter spring member 118. The retarder member applies a frictional force to advance member 66 to augment the the inertia advance force.

The turbine starter so far described is of a known type in wide use for starting gas turbine aircraft engines. Compressible fluid is normally introduced to plenum chamber 18 in a scheduled manner to avoid imposing shock loads which would damage the starter or engine. For starters having a self-contained gas turbine gas generator section, the pressure build-up is inherently less than instantaneous. While a modulated pressure build up is desirable, it introduces engagement characteristics of an impositive nature which it is an object of the present invention to overcome.

Pressurized fluid from chamber 18 passes through stator blades 22 which guide the angular vector of the fluid into turbine blade 14 and thereby drives turbine wheel 12. Exhaust fluid escapes to the atmosphere through openings 17 in casing section 16. Turbine wheel 12 drives the sun gear 32 of the planetary gear reduction unit through shafts 24 and 34. Sun gear 32 drives planet gears 36 about shaft 42 which, in turn, rotatably drive ring gear 38 and shaft 48 which are mounted for rotation on bearing 46. Assuming the limiting torque is not exceeded which would cause clutch 50 to slip, shaft 52 directly drives sleeve 54 rotationally. Rotary motion is transmitted through splines 64 and 68 to advance member 66. Due to the helical configuration of the splines and frictional effect of retarder 114, an axial force component is developed which traverses member 66 to the right against the bias of spring 100, bringing driving teeth 86 and driven teeth 88 into engagement so that starting torque may be transmitted to the engine. In the event teeth 86 and 88 abut on crown to crown contact, spring 76 will momentarily deflect until a mating engagement is achieved. The starter will accelerate the engine until it reaches a self-sustaining speed and begins acceleration under its own power. The engine driven clutch 90 will then overrun the starter driving clutch 72, causing teeth 86 and 88 to cam apart and overrun. When the starting mode is complete, the air source is shut off, allowing turbine wheel 12 to come to rest. The return force of spring 100 then becomes dominate, returning the clutch members to a fully disengaged position; however, engine clutch 90 is now rotating at high engine speed. To achieve full separation of clutches 72 and 90 during running operation, means equivalent to return spring 100 are required to insure separation and thus require that the advancement inertia and retarder induced forces overcome an initial bias. This causes advancement to be somewhat impositive on initial movement. A lack of precision during this point of operation allows turbine 12 to accelerate beyond the desirable engagement speed so that when engagement is effected, the high speeds may produce excessive shock loads on the engine. What is desired then is to obtain the full separation capability of an inertia advance mechanism with the quick initial engagement characteristics normally associated only with overrunning clutches or positive solenoid shift mechanism or even possibly inertia devices without a separation bias.

To accomplish this objective, we have conceived of the improvement of providing a pneumatic assist to provide quick positive engagement with a minimum of structural additions while retaining the beneficial feature of full separation.

In the execution of the invention, we have determined that many of the natural features of the turbine starter design illustrated may be utilized so that a very minimum of structural additions are required. It will be understood, however, that practice of the invention is not limited to the specific arrangement shown and the functional idea may also be applied to starters of different design which are believed to be within the non-inventive scope of the man skilled in the art, albeit somewhat more expensive to accomplish.

Figure 2:
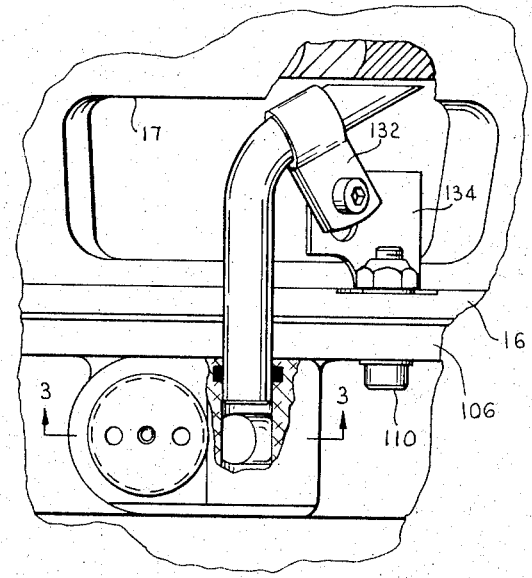
FIGURE 2 is a fragmentary view of the exterior of our turbine starter showing in detail pneumatic pressure pick-up means.
Figure 3:
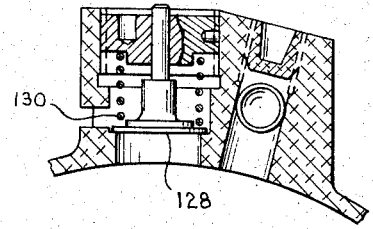
FIGURE 3 is cross-sectional view of a relief valve mechanism taken along section lines 3—3 of FIGURES 1 and 2.

One such natural feature was the discovery that pressurized air introduced into the housing section 106 which houses the reduction gearing produced a force acting on pressure surface 120 at the leftmost end of advance member 66. A relatively modest pressure was sufficient to more advance member 66 positively and quickly, even without inertia assist. This made it unnecessary to provide a separate loading piston and housing structure. One negative effect encountered was a tendency to blow grease from bearings 26 and 28 so that a running seal 122 was provided. A pressure pick up and transfer tube 124 was added to pick up air pressure exhausted by turbine 12 and transfer the air within the housing section 106 through raised boss 126. A pressure relief valve 128 normally biased in a closed direction by spring 130 is housed in boss 126. As best shown in FIGURE 2, pick up tube 124 has its pick up end aligned and clamped into position by strap clamp 132 and bracket 134 so that the tube is aligned with the vector of exhaust air from blades 14 when blades 14 are at rest. As turbine wheel 14 increases in speed, the rotational vector changes the absolute direction of escape air progressively out of alignment with pick up tube 124. As a consequence, maximum pressure is obtained at zero or low speeds of turbine wheel 12 and pressure is reduced as the wheel comes up to speed. This characteristic corresponds to the fact early and effective pressure transmission is required to initiate engagement of the starter jaws, but no hold in force is required so that its effect may be reduced or eliminated after engagement.

It would, of course, be possible to pick up pressurized air direct from plenum chamber 18; however, this would require a longer transmission tube, would reduce the air flow through turbine blades 14, and would not permit the variable pressure characteristic above described. Therefore, pressure sensing at turbine exhaust is preferred. It will also be understood that splines 64, 68 may be either straight axial splines or helical. If straight, pressure loading is the sole means of advancement, and if helical, advancement is produced by the combination of pressure and inertia loading.

The combined pressure plus inertia advance is preferred and produces a better blend of characteristics and provides a redundancy for better reliability in the event either system should be ineffective.

While only the preferred embodiment of our invention is shown, it will be understood that the changes suggested and others with the ambit of the man skilled in the art may be made without department from the invention defined by the following claims.

We claim:

1. A turbine driven starter comprising:
   a turbine member;
   a pressurized compressible fluid source for supplying motive fluid to said turbine member;
   engagement means having a driving member adapted to engage a driven member connected to the engine to be started;
   biasing means normally holding said driving member a spaced distance from the driven member;
   said engagement means being drivably connected to said turbine member for rotation therewith;

said engagement means having a pressure responsive surface; and pressure transmitting means interconnecting said compressible fluid source and said pressure responsive surface to actuate said engagement means in response to compressible fluid pressure;

said pressure transmitting means having a compressible fluid source pick-up on the exhaust side of said turbine member.

2. A turbine driven starter comprising:

a turbine member;

a pressurized compressible fluid source for supplying motive fluid to said turbine member;

a pair of mutually engageable and separable torque transmitting members;

spring means normally biasing said torque transmitting members in spaced apart separable relationship;

an inertia responsive advance member connected to said turbine member and rotationally driven thereby, said advance being connected to one of said pairs of torque transmitting members and operative to traverse axially when rotated to engage said torque transmitting members;

said inertia responsive advance member including a pressure responsive surface; and pressure pick up means having an opening disposed on the exhaust side of said turbine member to pick up pressurized fluid and transmit said fluid to said pressure responsive surface and assist engaging said torque transmitting members.

3. A turbine driven starter as claimed in claim 2 wherein said opening of said pressure pick up means is aligned with the static turbine exhaust vector and thereby having maximum pressure pick up efficiency when the turbine is static and progressively less efficient with increasing turbine speed.

4. A turbine driven starter comprising:

a turbine member;

a plenum chamber containing pressurized pneumatic fluid;

stator blade members interconnecting said plenum chamber and said turbine member to supply a motive driving fluid to said turbine;

drive means connected to and driven by said turbine member, said drive means including a first helical spline;

an advance member including a second helical spline formed thereon threadedly engaging said first helical spline;

a pair of mutually engageable and separable torque transmitting members, one of said torque transmitting members being connected to said advance member for movement into and out of engagement and the other of said torque transmitting members being adapted to be connected to an engine;

means biasing said one torque transmitting member in a disengaged position;

housing means substantially enclosing said drive means and one end of said advance member;

a retarder member retained in said housing means and frictionally engaging said advance member;

pressure transmitting means having one opening on the exhaust side of said turbine member to pick up pressurized exhaust fluid and another opening into said housing means;

said advance member having a pressure responsive means extending within said housing means to receive pneumatic actuating force from said exhaust fluid.

References Cited
UNITED STATES PATENTS

| | | | |
|---|---|---|---|
| 2,506,663 | 5/1950 | De Guerin | 123—179 |
| 2,775,894 | 1/1957 | Troeger et al. | 123—179 X |
| 2,942,415 | 6/1960 | Bayard | 60—39.14 |

JULIUS E. WEST, *Primary Examiner.*